(12) United States Patent
Drane

(10) Patent No.: US 10,530,140 B2
(45) Date of Patent: Jan. 7, 2020

(54) POKE-THROUGH DEVICE

(71) Applicant: Thomas & Betts International LLC, Wilmington, DE (US)

(72) Inventor: Mark R. Drane, Collierville, TN (US)

(73) Assignee: Thomas & Betts International LLC, Wilmington, DE (US)

(*) Notice: Subject to any disclaimer, the term of this patent is extended or adjusted under 35 U.S.C. 154(b) by 0 days.

(21) Appl. No.: 16/079,399

(22) PCT Filed: Feb. 24, 2017

(86) PCT No.: PCT/US2017/019449
§ 371 (c)(1),
(2) Date: Aug. 23, 2018

(87) PCT Pub. No.: WO2017/147489
PCT Pub. Date: Aug. 31, 2017

(65) Prior Publication Data
US 2019/0013659 A1    Jan. 10, 2019

Related U.S. Application Data

(60) Provisional application No. 62/300,548, filed on Feb. 26, 2016.

(51) Int. Cl.
*H02G 3/08* (2006.01)
*H02G 3/18* (2006.01)
*H02G 3/12* (2006.01)

(52) U.S. Cl.
CPC ............. *H02G 3/088* (2013.01); *H02G 3/081* (2013.01); *H02G 3/12* (2013.01); *H02G 3/185* (2013.01)

(58) Field of Classification Search
CPC .......... H02G 3/088; H02G 3/081; H02G 3/12; H02G 3/185; H02G 3/10; H02G 3/08;
(Continued)

(56) References Cited

U.S. PATENT DOCUMENTS 4,477,694 A * 10/1984 Kohaut ................... H02G 3/185
                                                                174/484
4,496,790 A *  1/1985 Spencer .................. H02G 3/22
                                                                174/484
(Continued)

FOREIGN PATENT DOCUMENTS

CA      2014327 A1    1/1991
CA      2831761 A1    5/2014

OTHER PUBLICATIONS

International Search Report and Written Opinion issued in corresponding international application No. PCT/US2017/019449, dated May 19, 2017, 14 pp.

(Continued)

*Primary Examiner* — Angel R Estrada
(74) *Attorney, Agent, or Firm* — Taft Stettinius & Hollister LLP; J. Bruce Schelkopf

(57) ABSTRACT

A poke-through device for installation in a hole in a floor structure, the floor structure defining a floor in a first working environment and a ceiling in a second working environment, the hole communicating between the first and second working environments, the poke through device. The poke-through device includes a body defining an interior and having an upper end and a lower end. A mounting frame is adapted to secure an electrical device within the body. A first intumescent member is disposed at the body upper end, and an electrical box is secured to the body lower end. A fire resistant gasket is disposed between the electrical box and the body lower end. The gasket includes openings therein to permit passage of wiring between the electrical box and the body.

22 Claims, 14 Drawing Sheets

(58) Field of Classification Search
CPC .......... H02G 3/086; H02G 3/01; H02G 3/121; H02G 3/125; H02G 3/14; H02G 3/283; H02G 3/285; H02G 3/18; H02G 3/0412; H02G 9/10; H05K 5/00; H05K 5/02; H05K 5/03; H05K 5/0247
USPC ....... 174/484, 50, 53, 57, 58, 480, 481, 482, 174/483, 486, 488, 489, 490, 495, 559; 220/3.2–3.9, 4.02; 52/220.1, 220.3, 52/220.8, 220.7
See application file for complete search history.

(56) References Cited

U.S. PATENT DOCUMENTS

| | | | | |
|---|---|---|---|---|
| 5,003,127 A * | 3/1991 | Sosinski | ............... | H02G 3/22 174/483 |
| 5,032,690 A * | 7/1991 | Bloom | ............... | H02G 3/22 174/487 |
| 5,079,292 A * | 1/1992 | Hoffman | ............... | C09J 183/04 524/862 |
| 5,107,072 A * | 4/1992 | Morgan | ............... | H02G 3/185 174/487 |
| 5,220,131 A * | 6/1993 | Wuertz | ............... | A62C 2/065 174/483 |
| 5,641,940 A * | 6/1997 | Whitehead | ............... | H02G 3/185 174/483 |
| 6,495,753 B1 * | 12/2002 | Goodsell | ............... | H02G 3/22 174/483 |
| 7,053,296 B2 * | 5/2006 | Drane | ............... | H02G 3/0493 174/483 |
| 7,082,729 B2 * | 8/2006 | Cole | ............... | H02G 3/185 174/53 |
| 7,678,993 B2 * | 3/2010 | Jolly | ............... | H02G 3/185 174/480 |
| 8,063,317 B2 * | 11/2011 | Bowman | ............... | H02G 3/185 174/480 |
| 9,148,007 B2 * | 9/2015 | Drane | ............... | H02G 3/185 |
| 9,490,616 B1 * | 11/2016 | Galasso | ............... | H02G 3/085 |
| 2008/0264665 A1 | 10/2008 | Jolly | | |

OTHER PUBLICATIONS

International Preliminary Report on Patentability issued in corresponding international application No. PCT/US2017/019449, dated Aug. 28, 2018, 8 pp.

Canada Intellectual Property Office, Requisition by the Examiner issued in corresponding Canadian application No. 3,015,209, dated May 29, 2019, 4 pp.

* cited by examiner

POKE-THROUGH DEVICE

This application is a National Stage filing of PCT Application No. PCT/US17/019449, having an International Filing Date of Feb. 24, 2017, which claims the benefit of priority to U.S. Provisional Application Ser. No. 62/300,548, filed on Feb. 26, 2016. Both of the aforementioned applications are incorporated by reference herein for all purposes in their entirety.

FIELD OF THE INVENTION

The present disclosure relates generally to electrical connections. More particularly, the disclosure relates to a fire resistant poke-through device.

BACKGROUND OF THE INVENTION

Much activity has been devoted to avoiding the necessity of using on-floor conduits for conveying electrical power and communication lines to floor locations which were not within the original architectural and electrical planning of a facility, such as a multi-floor concrete building. On-floor conduits are unsightly and may also pose a safety hazard to persons working in such an area.

One technique for avoiding the use of on-floor conduits involves the drilling of a hole through the concrete floor at a desired location and the routing of power or communication lines beneath the floor and then up through the hole. Transition apparatus known as "poke-throughs" have been developed for use in such interfloor holes. Such poke-throughs are subject to electrical and fire safety considerations. Among these are two fire-related requirements. First, the poke-through cannot function as a chimney or fire-advancing flue in the event of a fire on the lower floor. Second, the poke-through cannot function as a floor-to-floor heat conduction path.

These safety requirements have largely been met through the use of intumescent material. For example, U.S. Pat. Nos. 5,003,127 and 5,107,072 disclose a poke-through assembly wherein a sheet of intumescent material is wired in place about a housing, and expands to fill and block the interfloor hole in the event of fire. Furthermore, thermally insulating materials have been interposed between metallic (and therefore heat conductive) portions of the poke-through devices. Thus, poke-through devices have come into common use.

With greater use of poke-through devices, there is, of course, interest in making their manufacturing economical, their installation easier and faster, and their retention more positive. The United States Patent of James H. Whitehead, entitled "Poke-Through Electrical Connection Assembly Retainer," U.S. Pat. No. 5,641,940, presents a solution to the problems of rapid installation, positive retention, and economical manufacturing. The '940 patent discloses a self-anchoring poke-through electrical connection assembly retainer, as well as a pre-formed intumescent material structure which is easy to apply during the manufacturing process.

However, problems still remain with the use of poke-through devices. One such problem involves ensuring that the intumescent material expands to completely fill and maintain a filled state long enough for the unit to meet applicable fire safety standards. Retaining the intumescent material in the poke-through under fire conditions has also proved challenging.

Accordingly, it would be desirable to provide a poke-through device that under fire conditions retains the intumescent material and permits the intumescent material to completely fill the poke-through.

SUMMARY OF THE INVENTION

The present disclosure provides a poke-through device for installation in a hole in a floor structure, the floor structure defining a floor in a first working environment and a ceiling in a second working environment, the hole communicating between the first and second working environments. The poke-through device includes a body defining an interior and having an upper end and a lower end. A mounting frame is adapted to secure an electrical device within the body. A first intumescent member is disposed at the body upper end, and an electrical box is secured to the body lower end. A fire resistant gasket is disposed between the electrical box and the body lower end. The gasket includes openings therein to permit passage of wiring between the electrical box and the body.

The present disclosure also provides a poke-through device including a body defining an interior and having an upper end and a lower end. A mounting frame adapted to secure an electrical device is disposed within the body. A first intumescent member is disposed on the body upper end. A second intumescent member is disposed in the body between the mounting frame and the body lower end. An electrical box is secured to the body lower end.

The present disclosure still further provides a poke-through device including a body defining an interior and having an upper end and a lower end. A mounting frame including a plurality of metallic mounting plates secured thereto adapted to secure an electrical device within the body. A first intumescent member disposed on the body upper end, and a second intumescent member disposed in the body between the mounting frame and the body lower end. A metallic electrical box is secured to the body lower end. A fire resistant gasket is disposed between the electrical box and the body lower end. The gasket includes slits therein to permit passage of wiring between the electrical box and the body and retain the intumescent material in the body during a fire condition.

DETAILED DESCRIPTION

Figure 1:
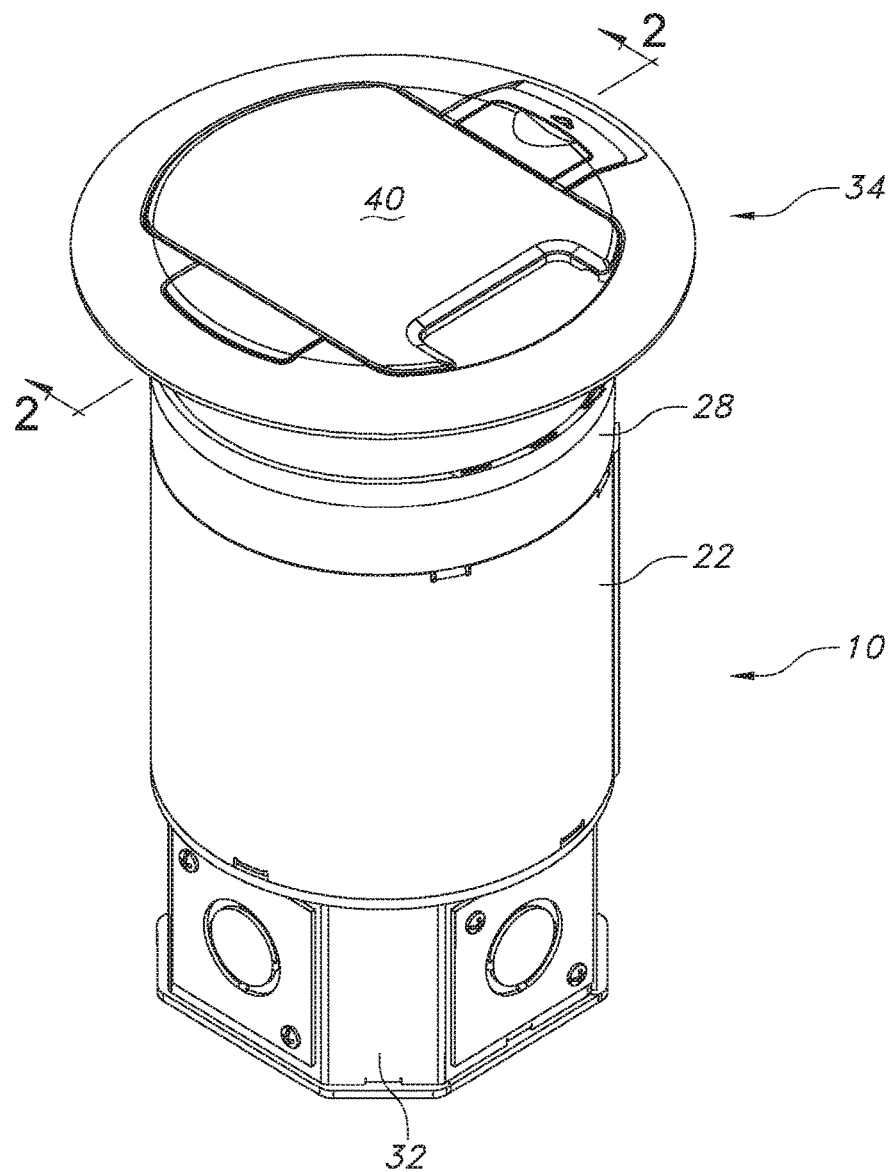
FIG. 1 is a perspective view of a poke-through device of the present disclosure.

Referring initially to FIGS. 1-4, a poke-through device, designated generally as 10, is sized and configured to provide a housing for one or more electrical devices 12 including electrical power receptacles and data connections. The poke-through device 10 is preferably for installation in an interfloor receiving hole 14 in a floor structure 16, and the floor structure defines a floor 18 in a first working environment and a ceiling 20 in a second working environment. The hole 14 communicates between the first and second working environments. In a preferred poke-through device 10 as shown in FIGS. 1B and 2A, the electrical devices 12 connected to wiring 13 are recessed below the plane defining the surface of the floor 18. Although the present application refers generally to running of wiring, it is to be understood that data cables, fiber optic cables or similar structures are also within the scope of the disclosure.

Figure 2:
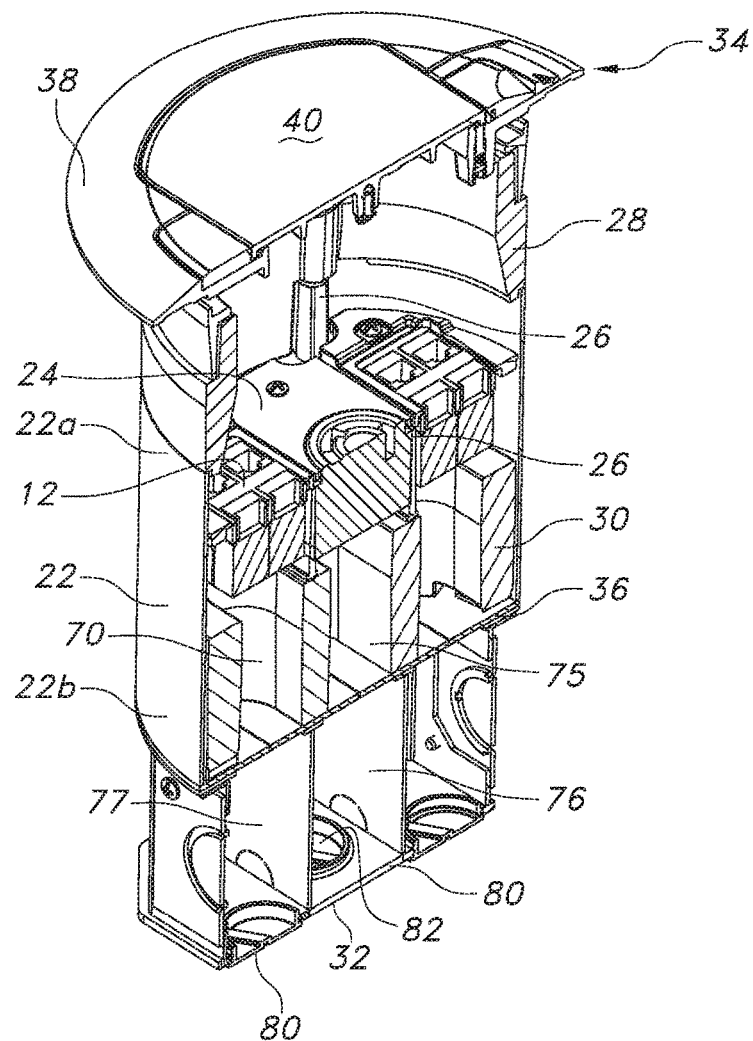
FIG. 2 is a cross-sectional perspective view taken along line 2-2 of FIG. 1.
Figure 2A:
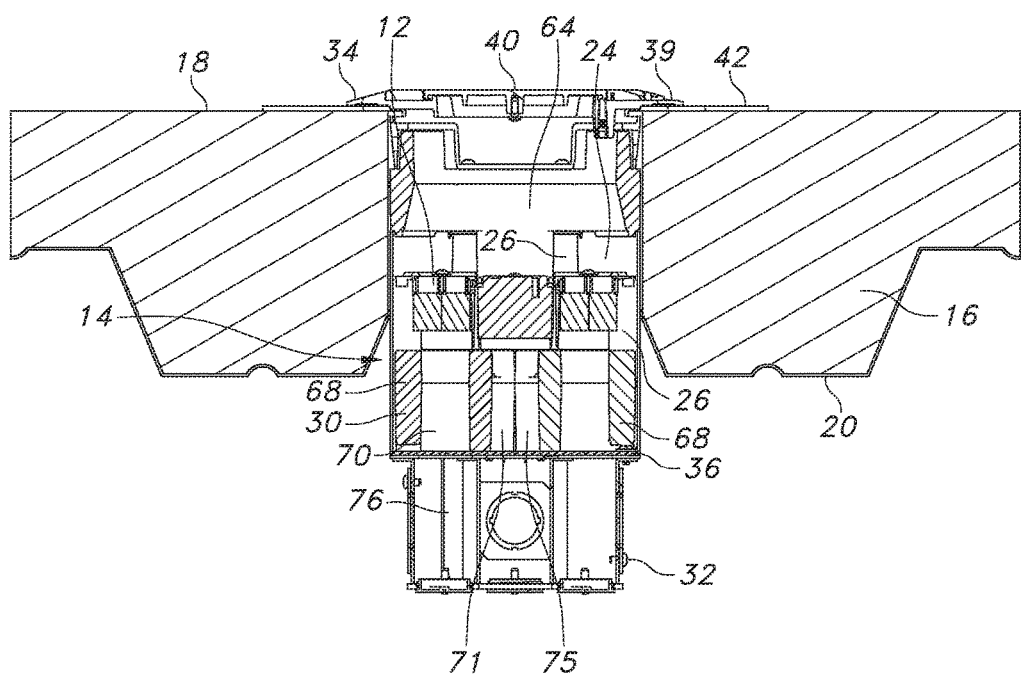
FIG. 2A is a cross-sectional elevational view taken along line 2-2 of FIG. 1, showing the poke-through device mounted in a floor structure.
Figure 2B:
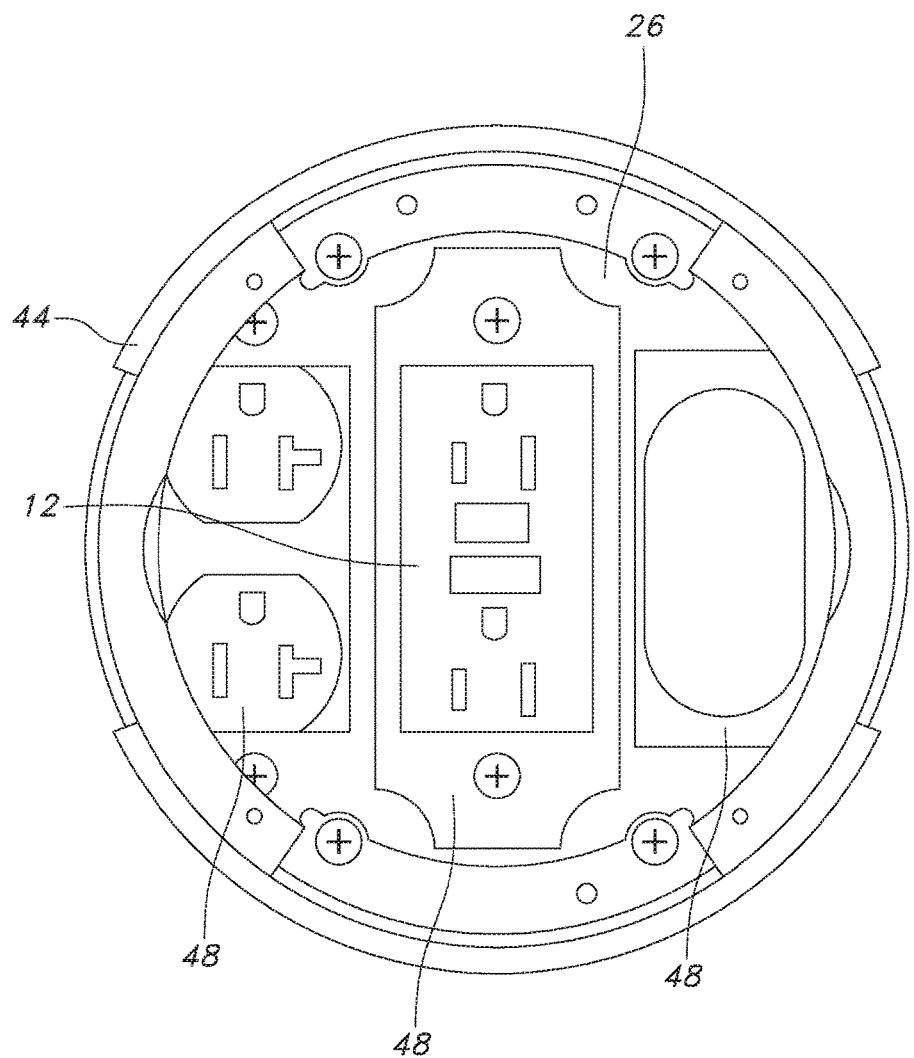
FIG. 2B is a top elevational view of the poke-through device with a cover assembly removed.
Figure 3:
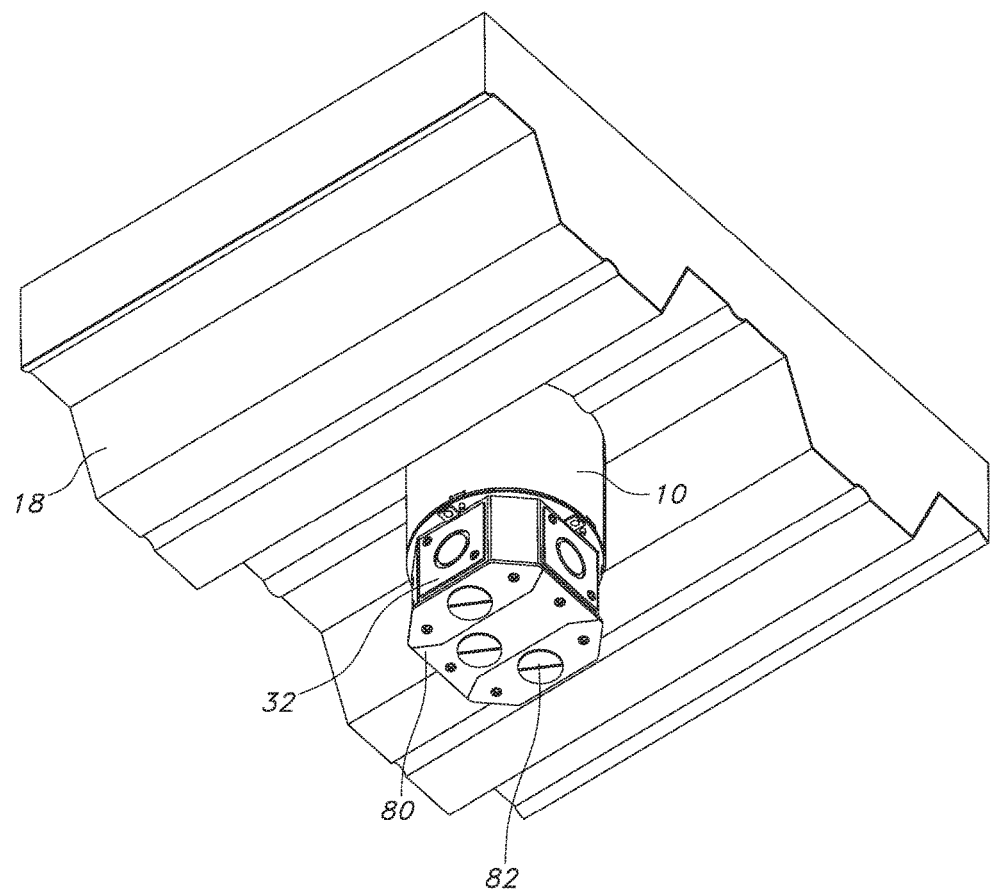
FIG. 3 is a bottom perspective view showing the poke-through device mounted in a floor structure.
Figure 4:
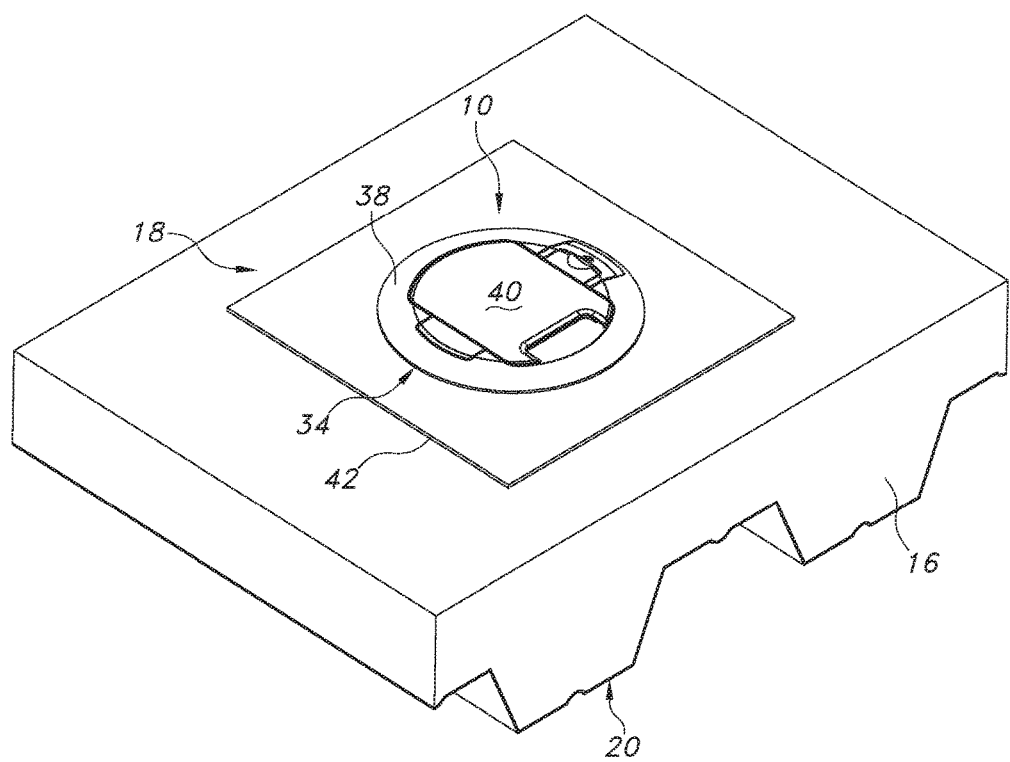
FIG. 4 is a top perspective view showing the poke-through device mounted in a floor structure.

As shown in FIGS. 2A, and 3-4, poke-through device 10 is sized and configured for installation in a device-receiving hole 14 extending through a floor structure 16, typically formed of concrete. As will be appreciated by those skilled in the art, poke-throughs are used to add and/or supplement electrical power and data capability in existing buildings. Accordingly, the floor structures in question are not pre-built or pre-cast with underfloor passages for routing of wires. Thus, holes 14 may be drilled through existing floor structures of existing buildings.

Figure 5:
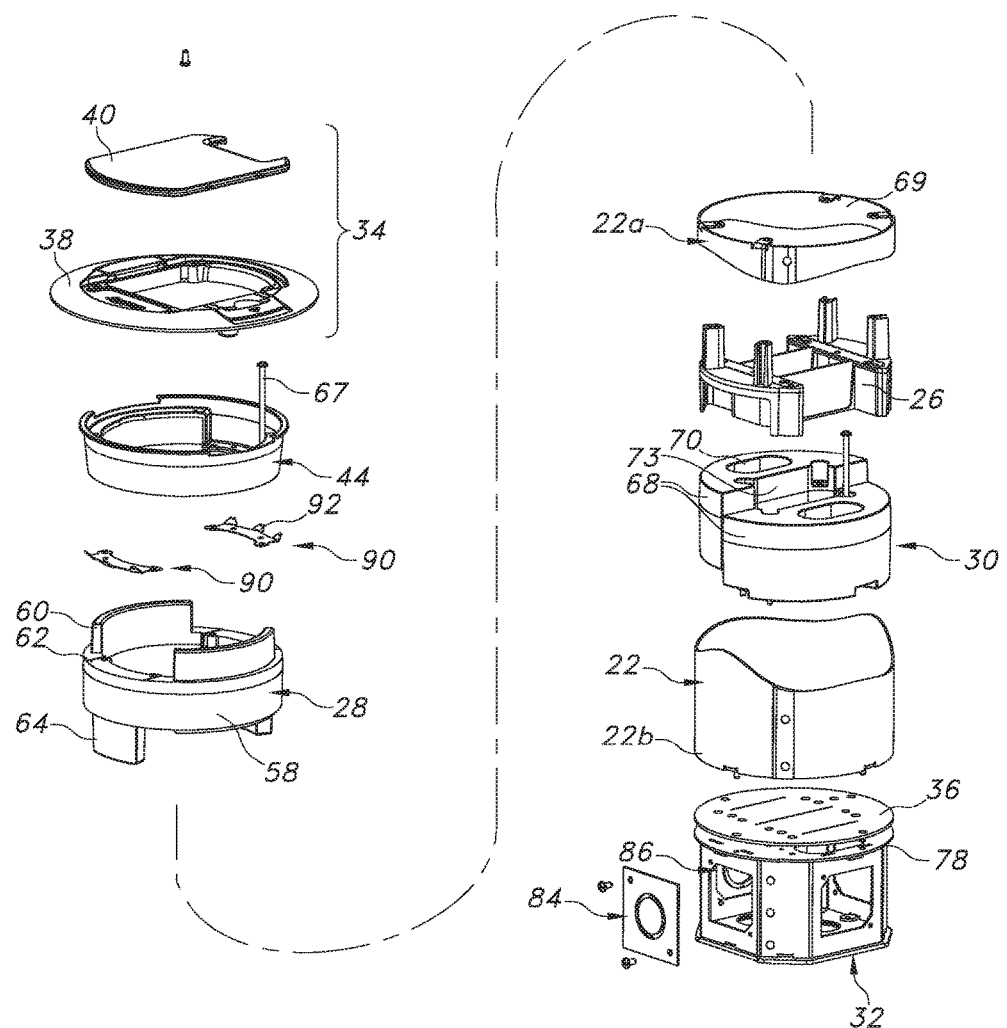
FIG. 5 is an exploded perspective view of the poke-through device.

Referring to FIGS. 1, 2, and 5, poke-through device 10 includes a tubular body 22 having an upper and lower end 22a and 22b. Body 22 may be formed of metal material for heat resistance. The body defines an interior 24 which contains therein a mounting frame 26 for supporting electrical devices 12. The body 22 further includes thereon an upper intumescent member 28 disposed above the mounting frame 26. A lower intumescent member 30 is disposed within the body 22 below the mounting frame 26. The intumescent members 28 and 30 are made of an intumescent material that is initially rigid but will expand upon being subjected to heat such as in a fire condition, thereby creating a fire stop. An electrical box 32 is connected to the body lower end 22b, and a cover assembly 34 is mounted to the body upper end 22a. The electrical box 32 may be in the form of a junction box. A fire barrier in the form of a fire resistant gasket 36 is disposed between the electrical box 32 and the body 22.

The cover assembly 34 may include frame 38 defining an opening covered by a lid 40 pivotally secured to the frame 38 and moveable between an open and a closed position. The frame 38 and lid 40 may be formed of metal. The lid 40 provides selective access to the electrical devices 12 secured within the poke-through 10. The frame 38 may have a tapered surface 39 to reduce tripping hazards as shown in FIG. 2A. The cover assembly 34 may, for example, be of the type described in U.S. Pat. Nos. 8,357,852, or 8,921,695 both of which are incorporated by reference herein. However, it is to be understood that cover assemblies having different configurations may be used.

The cover assembly may sit on a flooring covering 42 that is disposed between the frame's lower surface and the floor surface 18 as shown in FIG. 2A. The cover frame 38 may be secured to a collar 44 which is disposed adjacent to body upper end 22a.

With reference to FIGS. 2A, 2B, 6 and 7, the mounting frame 26 is disposed in the body 22 between the upper 28 and lower 30 intumescent members. The mounting frame 26 provides a structure to which electrical devices 12 may be secured. With specific reference to FIGS. 6 and 7, the mounting frame 26 may have two ends 45 connected by a pair of dividers 46 that create three open sections 48. Each section 48 or gang may contain an electrical device 12 such as a power receptacle/outlet or a data connector/jack. A plurality of posts 50 extend upwardly from a mounting frame upper surface 52. These posts 50 support thereon the upper intumescent member 28. The end 45 may have an arcuate outer periphery to conform to the tubular-shaped body 22 in which the mounting frame 26 is disposed. The mounting frame 26 may be formed of a polymer non-heat conducting material such as polycarbonate. In the event of a fire condition, the mounting frame 26 will melt, and therefore, the mounting frame will not form a heat sink or a conductor of heat through the poke-through body.

Figure 6:
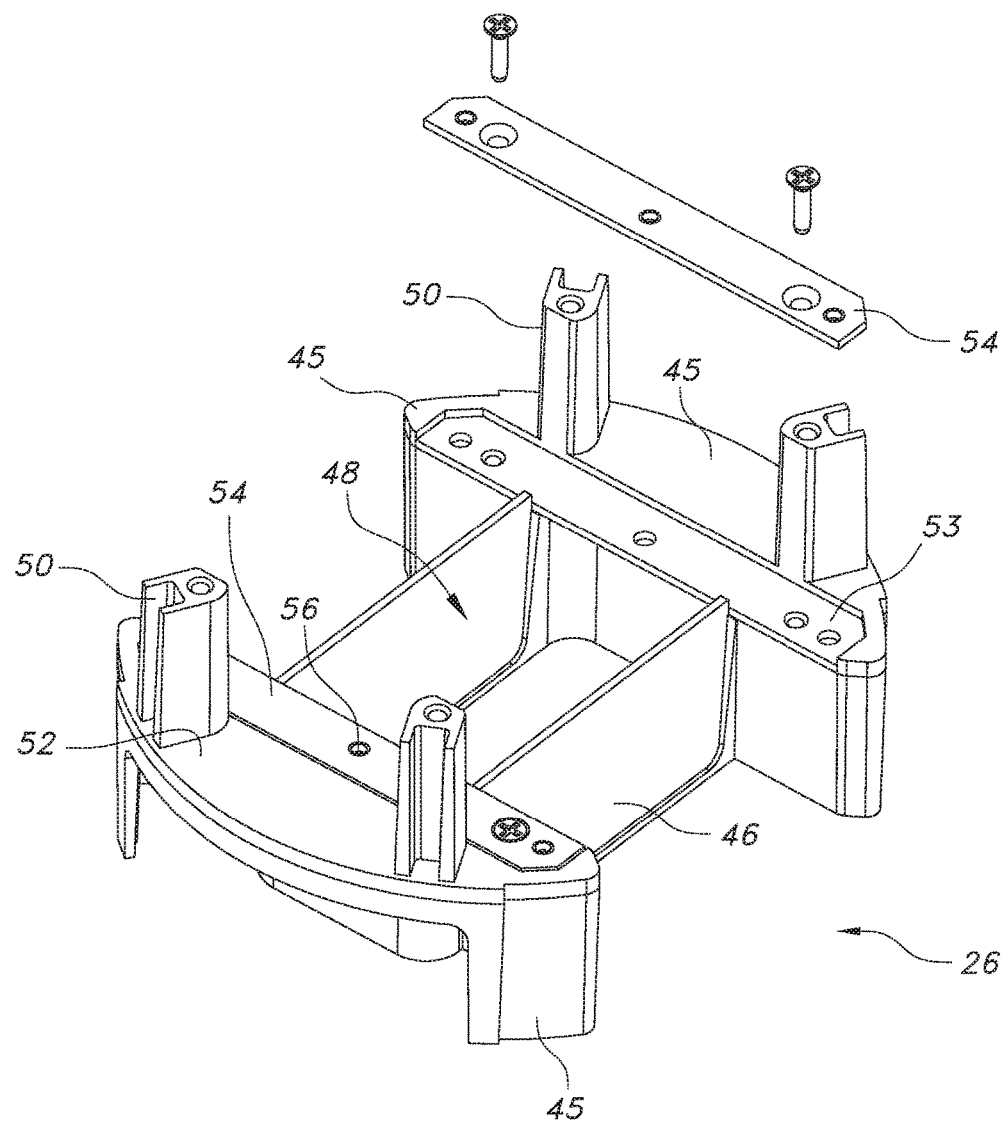
FIG. 6 is an exploded perspective view of an electrical device mounting frame.
Figure 7:
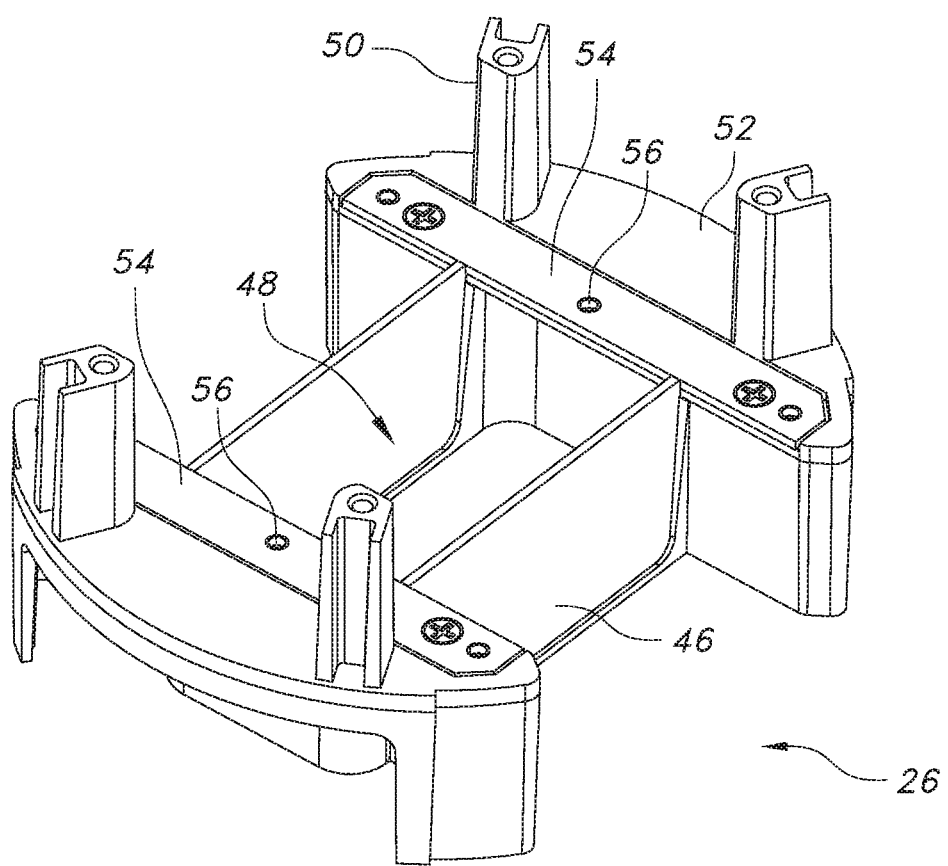
FIG. 7 is a perspective view of the electrical device mounting frame.

With further reference to FIGS. 6 and 7, with the mounting frame 26 may be formed of a polymer material, using threaded fasteners to secure the electrical devices 12 thereto may result in the fasteners stripping out the mounting frame material. In order to address this issue, the two mounting frame 45 each may include a metallic mounting plates 54 secured thereto. The metallic mounting plates 54 may be elongate members that provide attachment points 56 for the electrical devices 12 to be firmly secured to the mounting frame 26. The attachment points 56 may be in the form of threaded openings to which electrical devices 12 can be secured using standard fasteners. The mounting frame 26 may include recesses 53 to accommodate the mounting plates 54. Therefore the top of the mounting plates 54 are flush with a top surface of the mounting frame. With the electrical devices 12 secured to the metallic plates 54, there is much less likelihood that threaded fasteners used for such a connection will strip the mounting frame material.

With reference to FIG. 1B, face plates 55 may be secured to the top of the electrical devices 12. The faceplates may have openings and configurations that correspond to the particular electrical device to which they are attached. For example, one faceplate may have two openings for a duplex outlet and other may have a single opening for a GFCI outlet.

As shown in FIGS. 1A, 2, 2A, and 5, disposed above the mounting frame is the upper intumescent member 28 which may be in the form of a ring-shaped member. The upper intumescent member 28 sits on top of the body upper end 22a. The upper intumescent member 28 includes an annular body 58 having a pair of spaced arcuate shaped walls 60 extending upwardly therefrom. The walls 60 are offset from the body perimeter creating a ledge 62 on which the collar 44 sits. The upper intumescent member 28 may further include a pair of diametrically opposed lugs 64 extending from a bottom surface of the annular body 58 which fit in between the posts 50 extending from the mounting 26 frame. The upper intumescent member 28 is sized and located such that when exposed to heat of a predetermined degree will expand and flow to completely fill the space 66 between the mounting frame 26 and the cover assembly and block any openings extending through the poke-through. This prevents fire and hot gases from traveling though the poke-through. Fasteners 67 may extend through the collar 44 and through the upper intumescent member and threadedly engage tabs 69 (FIG. 5) extending inwardly from the body upper end 22a in order to secure the collar 44 and the upper intumescent member to the body 22.

In a preferred embodiment, the mounting frame 26 may be supported on the lower intumescent member 30 which may be formed of intumescent material of a type known in the art. The lower intumescent member 30 may have a round shape conforming to the tubular body 22. The lower intumescent member 30 may be formed of two similarly formed semi-circular blocks 68 as shown in FIG. 5. Each block 68 includes a passage 70 formed within to permit wiring to extend there through. Each block has a recess 73 in a side wall such that when the two blocks 68 are placed together they from a center passage 75 to permit wiring to extend there through. In this manner, a plurality of electrical wires extending through one passage remains spaced and electrically insulated from a plurality of data wires extending through the other passage 70. When the lower intumescent member 30 is sized and located such that when it is subjected to heat, such as from a fire condition, the lower intumescent member 30 will expand and flow to completely filling the space 71 (FIG. 2A) defined between the mounting frame 26 and the electrical box 32. The material when expanded will also rise and fill around electrical devices 12. The passages 70 will cease to exist and the tube 22 will be completely blocked upon expansion of the lower intumescent member 30. Therefore, a fire stop will be created to prevent fire and hot gases from flowing through the poke through device. 10.

Figure 8:
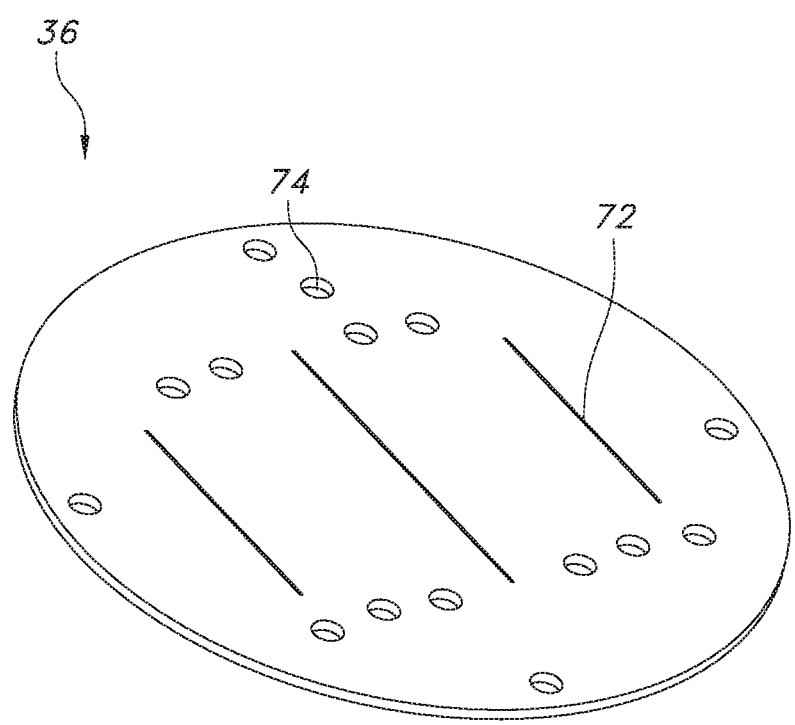
FIG. 8 is a perspective view of a fire barrier gasket.
Figure 9:
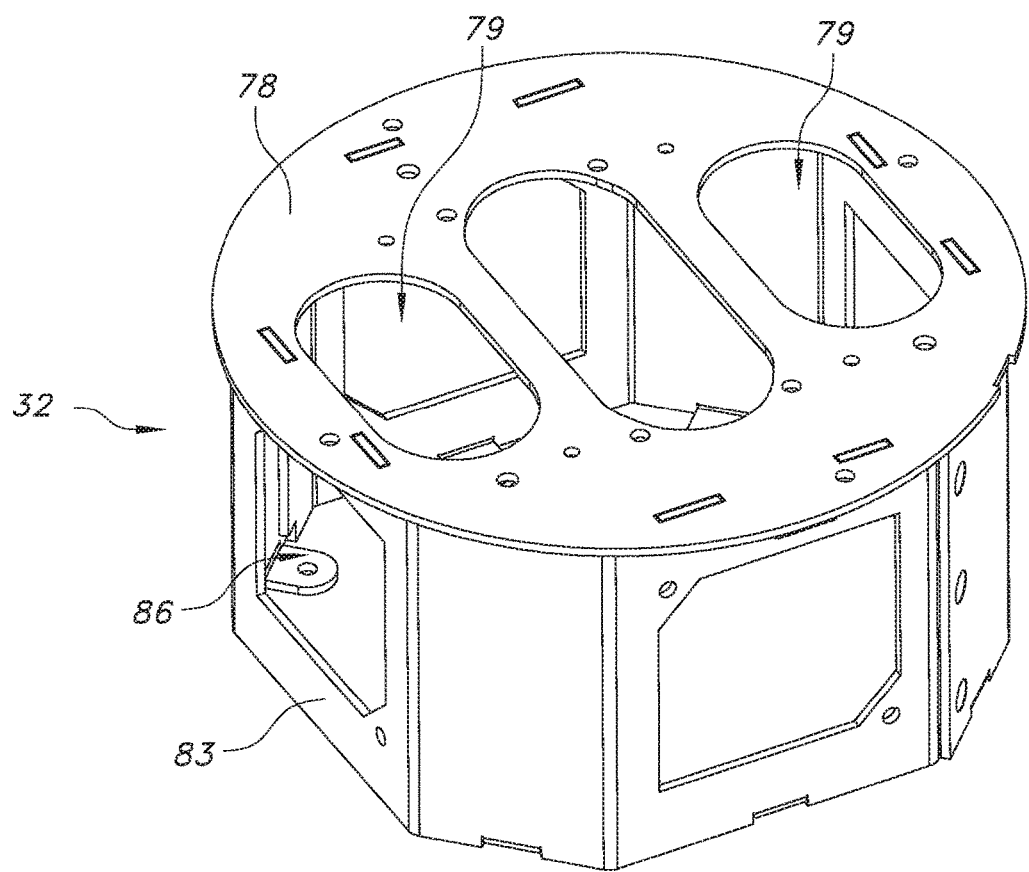
FIG. 9 is a perspective view of an electrical box.

With additional reference to FIGS. 1B, 8 and 9, in order to help retain the intumescent material of the lower intumescent member in the body 22, the gasket 36 is sandwiched between a top surface of the electrical box 32 and the body lower end 22b. Openings 79 exist in the electrical box 32 to allow the wiring therein to travel through the lower intumescent member 30 and be secured to the electrical devices 12. Upon a fire condition, wherein the upper and lower intumescent blocks are heated to a predetermined temperature, the material will begin to expand. The expanding intumescent material blocks through holes and openings extending through the body 22 of the poke-through in order to prevent a flow of air therethrough. The gasket 36 helps to restrict the intumescent material from expanding into the electrical box 32 and maintains the material within the metal portion of poke-through body 22 and contained within the concrete floor when a fire condition is present. In this way, none of the intumescent material leaves the 22 body of the poke-through and all of the openings within the body 22 can be properly sealed.

With reference to FIG. 8, the gasket 36 is a flexible member and may be formed of a high-temperature fabric coated material with a high-temperature elastomeric material to create a fire and heat barrier. In one embodiment, the gasket 36 may be formed of silicon coated fiberglass cloth. The gasket 36 may include a plurality of slits 72 formed therein to allow power and data cables to pass from the electrical box 32 into the poke-through body 22. The gasket 36 is pliable and the material defining the slits 72 resiliently engages and urges against the wiring and maintains a close fit around the wires to keep the expanding intumescent material from falling into the electrical box during fire exposure. The gasket 36 may also include a plurality of openings 74 therein to accommodated mounting fasteners used to secure the electrical box 32 to the body 22.

Figure 1A:
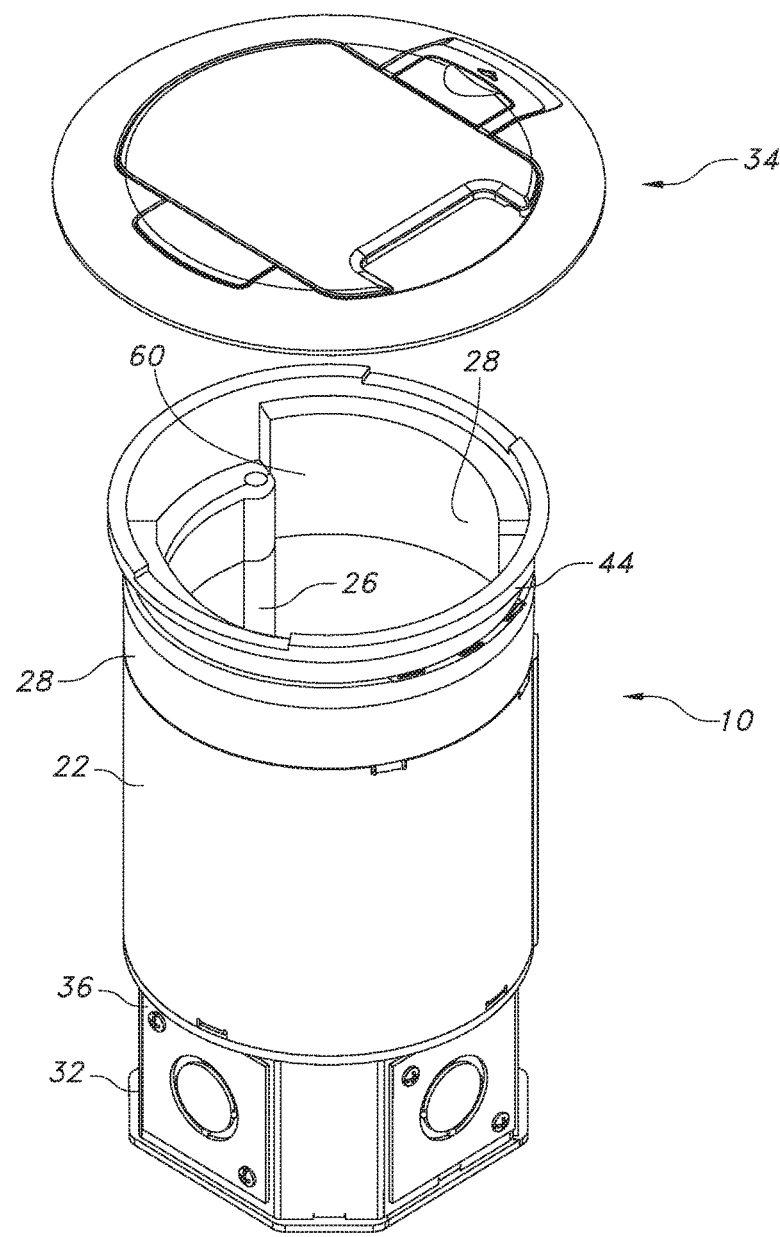
FIG. 1A is a perspective exploded view showing of the poke-through device.
Figure 1B:
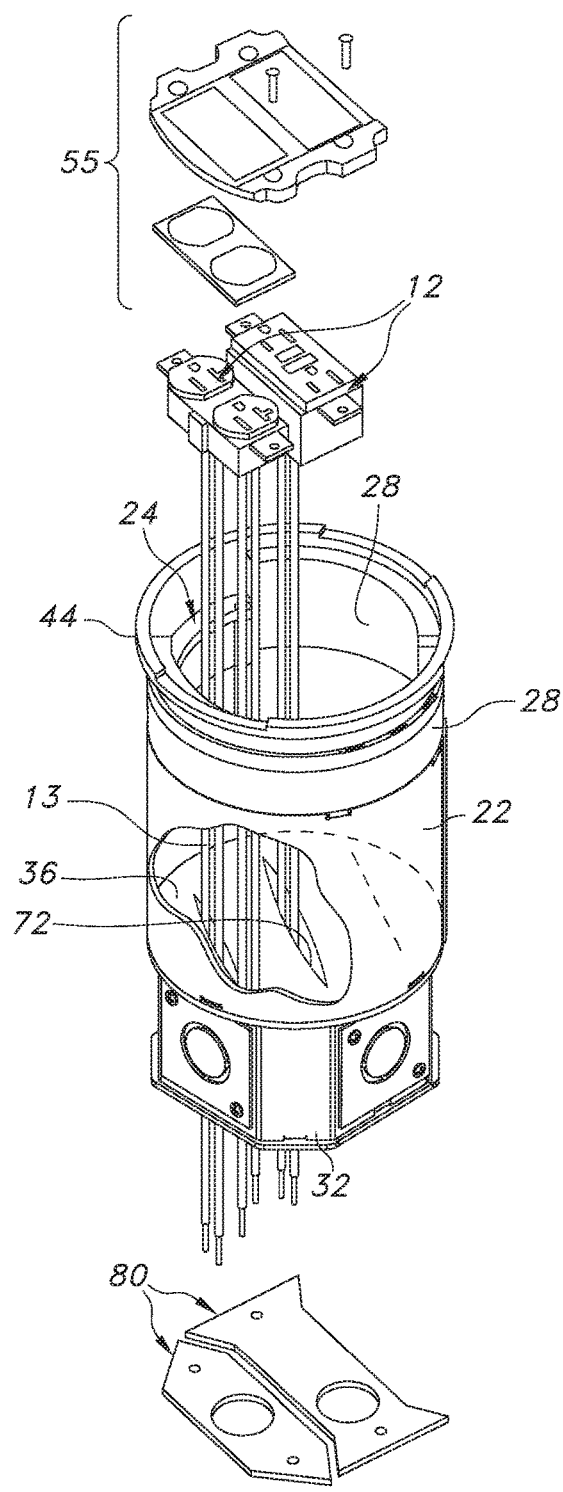
FIG. 1B is a perspective exploded view showing of the poke-through device and electrical device and wiring with a portion of the body cut away.
Figure 10:
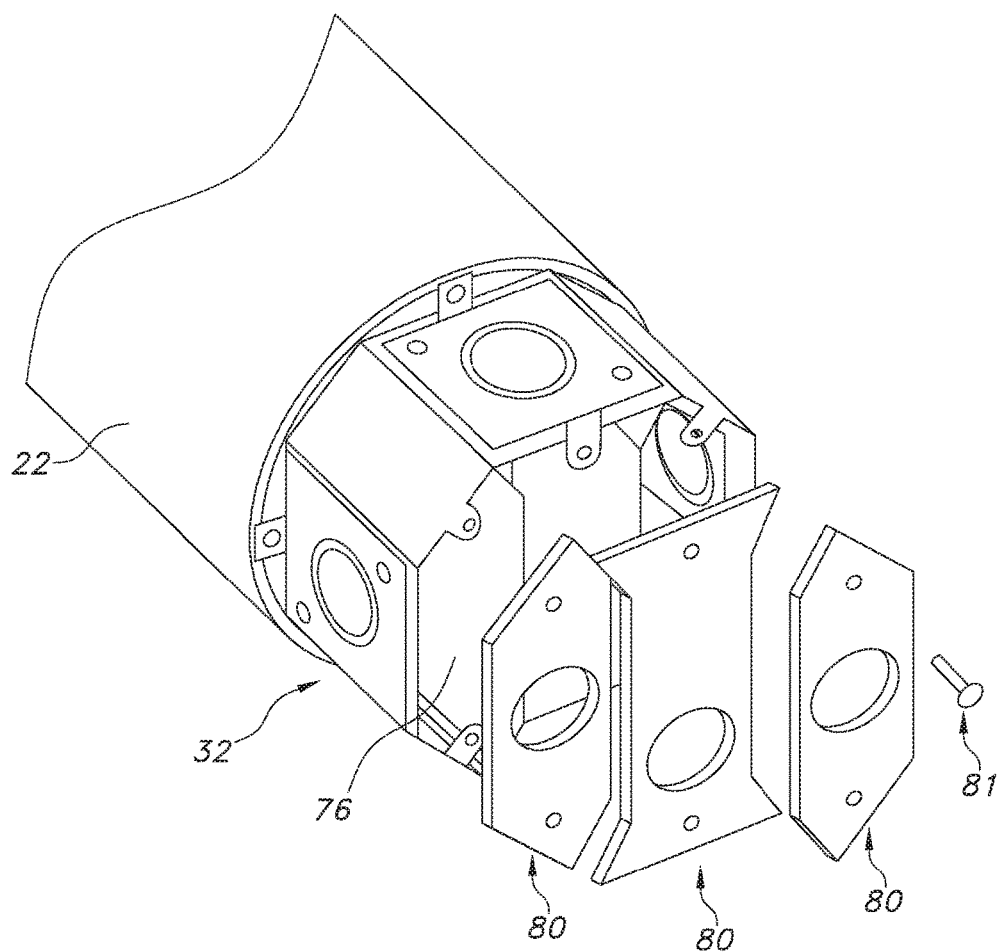
FIG. 10 is an exploded bottom perspective view of the electrical box.

With reference to FIGS. 1-3, 5 and 9, the electrical box 32 which is located below the fire-resistant gasket 36 is attached directly to the lower end 22b of the poke-through body 22. The electrical box 32 may be secured to the lower portion of the body 22b with fasteners such as screws. The electrical box 32, which may be formed of a metallic material such as steel, acts as a fire shield during a fire. Accordingly, the electrical 32 box also acts as a barrier to prevent a fire or smoke and hot gasses from extending upwardly through the poke-through 10. The gasket 36 helps to seal the connection between the electrical box 32 and the body 22 to prevent fire or hot gasses from entering there between. The electrical box may include dividers 76 within, shown in FIG. 2, in order to permit power lines and data lines to be contained therein and separated. The dividers 76 may be removable to create a desired number of gangs or spaces 77. The electrical box may have a metal top 78 having openings 79 therein. The top 78 provides support to the fire-resistant gasket 36 and also supports the lower intumescent member 30 disposed on top of the gasket 36. The lower wall of the electrical box may be formed of one or more removable metal plates 80. For example as shown in FIGS. 1A, 2 and 10, the box 32 is divided into three gangs 77, and the bottom of each gang is covered by a separate plate 80 secured to the box by a fastener 81. Each plate 80 may have a knock out 82 to permit wiring to pass into the electrical box. The side walls 83 of the electrical box may include removable plates 84 covering openings 86 in order to facilitate connecting electrical wiring to the box.

With reference to FIG. 5, the poke through 10 preferably includes at least one retainer clip 90 to permit easy insertion of the poke through 10 into an interfloor receiving hole 14, and to substantially prevent subsequent withdrawal of the poke through 10 from the hole. Preferably, at least two opposed clips 90 are provided on the poke-through device 10, separated from each other by about 180 degrees. The clips are positioned between the upper intumescent member 28 and the collar 44. In one preferred embodiment, clips 90 are made of spring temper steel having fingers 92 that engage the side of the receiving hole 14. The clips 90 prevent the poke-through device from being removed from the hole 14 once it is installed.

While there have been described what is presently believed to be the preferred embodiments of the invention, those skilled in the art will realize that various changes and modifications may be made to the invention without departing from the invention, and it is intended to claim all such changes and modifications as fall within the scope of the invention.

What is claimed is:

1. A poke-through device for installation in a hole in a floor structure, the floor structure defining a floor in a first working environment and a ceiling in a second working environment, the hole communicating between the first and second working environments, the poke through device comprising:
   a body defining an interior and having an upper end and a lower end;
   a mounting frame adapted to secure an electrical device within the body;
   a first intumescent member disposed at the body upper end;
   an electrical box secured to the body lower end; and
   a fire resistant gasket disposed between the electrical box and the body lower end, the gasket including openings therein to permit passage of wiring between the electrical box and the body.

2. The poke-through device as defined in claim 1, wherein the gasket includes at least one slit therein to permit passage of wiring from the electrical box to the body.

3. The poke-through device as defined in claim 2, wherein the gasket is disposed between a top surface of the electrical box and the body lower end.

4. The poke-through device as defined in claim 1, wherein the gasket is formed of silicon coated fiberglass cloth.

5. The poke-through device as defined in claim 1, wherein the first intumescent member is disposed on the body, wherein a portion of the first intumescent member extends above the body and a portion extends into the body.

6. The poke-through device as defined in claim 1, a second intumescent member disposed in the body between the mounting frame and the body lower end, the second intumescent member including openings therein to permit wiring to pass therethrough.

7. The poke-through device as defined in claim 1, including a cover assembly secure above the body upper end.

8. The poke-through device as defined in claim 7, wherein the cover assembly includes a lid movable between an open and closed position.

9. The poke-through device as defined in claim 1, wherein the mounting frame is formed of a non-metallic material.

10. The poke-through device as defined in claim 9, including a plurality of metallic mounting plates secured to the mounting frame, the plurality of mounting plates adapted to secure an electrical device within the body.

11. The poke-through device as defined in claim 1, wherein the electrical box is formed of a metallic material, and includes a metallic top secured to the body lower end, the top engaging and supporting the gasket.

12. A poke-through device comprising:
a body defining an interior and having an upper end and a lower end;
a mounting frame adapted to secure an electrical device within the body;
a first intumescent member disposed on the body upper end;
a second intumescent member disposed in the body between the mounting frame and the body lower end;
a fire resistant gasket disposed between the electrical box and the body lower end, the gasket including a slit that is sized and positioned to accommodate passage of wiring through the gasket, wherein the gasket is structured to resiliently urge portions of gasket that define the slit against wiring that passes through the slit and an electrical box secured to the body lower end.

13. The poke-through device as defined in claim 12, wherein the gasket further includes openings therein to permit passage of mounting fasteners between the electrical box and the body.

14. The poke-through device as defined in claim 12, wherein the first intumescent member is a ring-shaped member.

15. The poke-through device as defined in claim 14, wherein the first intumescent member is sized such that upon a fire condition, the first intumescent member expands to fill a volume of the body between the mounting frame and the body upper end.

16. The poke-through device as defined in claim 15, wherein the second intumescent member is sized such that upon a fire condition, the first intumescent member expands to fill a volume of the body between the mounting frame and the electrical box.

17. The poke-through device as defined in claim 12, wherein the mounting frame is formed of a thermally non-conductive polymer material.

18. The poke-through device as defined in claim 17, wherein at least one metallic plate is secured to the mounting frame, the metallic plate having mounting points thereon adapted to secure an electrical device thereto.

19. A poke-through device comprising:
a body defining an interior and having an upper end and a lower end;
a mounting frame including a plurality of metallic mounting plates secured thereto adapted to secure an electrical device within the body;
a first intumescent member disposed on the body upper end;
a second intumescent member disposed in the body interior between the mounting frame and the body lower end;
a metallic electrical box secured to the body lower end; and
a fire resistant gasket disposed between the electrical box and the body lower end, the gasket including slits therein to permit passage of wiring between the electrical box and the body and to retain the intumescent material in the body during a fire condition.

20. The poke-through device as defined in claim 19, wherein the second intumescent member includes a pair of blocks each having an opening therethrough adapted to permit wiring to extend between the electrical box and the mounting frame.

21. The poke-through device as defined in claim 20, wherein the pair of blocks each have a recess formed in a side wall wherein the pair of blocks form a central passage when placed in the body interior.

22. The poke-through device as defined in claim 19, wherein the slits are adapted to closely conform to wiring passing there through to prevent expanding intumescent material from entering the electrical box when subjected to a fire condition.

* * * * *